United States Patent
Sadamitsu

(10) Patent No.: US 11,396,835 B2
(45) Date of Patent: Jul. 26, 2022

(54) ELECTRICALLY HEATED CATALYTIC DEVICE

(71) Applicant: TOYOTA JIDOSHA KABUSHIKI KAISHA, Aichi-ken (JP)

(72) Inventor: Takahiro Sadamitsu, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/020,825

(22) Filed: Sep. 15, 2020

(65) Prior Publication Data
US 2021/0108546 A1 Apr. 15, 2021

(30) Foreign Application Priority Data
Oct. 9, 2019 (JP) .............................. JP2019-185866

(51) Int. Cl.
*F01N 3/20* (2006.01)
*F01N 3/28* (2006.01)
*B01D 53/94* (2006.01)
*B01J 35/04* (2006.01)

(52) U.S. Cl.
CPC ........... *F01N 3/2026* (2013.01); *B01D 53/94* (2013.01); *B01J 35/04* (2013.01); *F01N 3/2803* (2013.01)

(58) Field of Classification Search
CPC ..... F01N 3/2026; F01N 3/2803; B01D 53/94; B01J 35/04
USPC ........................................................ 422/174
See application file for complete search history.

(56) References Cited

U.S. PATENT DOCUMENTS

| 5,245,825 | A  | * | 9/1993  | Ohhashi ............. B01D 53/9454 60/300 |
| 8,329,110 | B2 | * | 12/2012 | Kinoshita ............. F01N 3/2026 422/177 |
| 8,597,585 | B2 | * | 12/2013 | Sakashita ................. H05B 3/16 422/174 |
| 8,679,413 | B2 | * | 3/2014  | Ishihara ............... F01N 3/2026 422/174 |
| 8,765,068 | B2 | * | 7/2014  | Ishihara ................... H05B 3/42 422/174 |
| 9,295,944 | B2 | * | 3/2016  | Takagaki ............... H01C 17/28 |
| 9,422,852 | B2 | * | 8/2016  | Yoshioka .............. F01N 3/2026 |
| 9,516,702 | B2 | * | 12/2016 | Noro ........................ B01J 35/04 |
| 9,845,714 | B2 | * | 12/2017 | Mori ..................... F01N 3/2026 |

(Continued)

FOREIGN PATENT DOCUMENTS

JP       201292820 A     5/2012
JP       2012106199 A    6/2012

*Primary Examiner* — Tom P Duong
(74) *Attorney, Agent, or Firm* — Hauptman Ham, LLP

(57) ABSTRACT

An electrically heated catalytic device includes a carrier that supports a catalyst, a surface electrode provided on an outer circumferential surface of the carrier, and metal electrodes arranged side by side on the surface electrode. The surface electrode includes an arrangement region where the metal electrodes are arranged and a non-arrangement region where the metal electrodes are not arranged. The metal electrodes are spaced apart from one another in an axial direction of the carrier in the arrangement region. The non-arrangement region is adjacent to the arrangement region in the axial direction of the carrier. An electrical resistance of the non-arrangement region is higher than an electrical resistance of the arrangement region in the surface electrode.

10 Claims, 11 Drawing Sheets

(56) References Cited

U.S. PATENT DOCUMENTS

| | | |
|---|---|---|
| 10,071,343 B2 * | 9/2018 | Nakayama ............ F01N 3/2853 |
| 2012/0076698 A1 | 3/2012 | Ishihara |
| 2012/0121476 A1 * | 5/2012 | Kinoshita ............. F01N 3/2013 422/174 |
| 2015/0247436 A1 * | 9/2015 | Nakayama ........... B01J 19/2485 29/890 |
| 2016/0032806 A1 | 2/2016 | Sugiyama et al. |
| 2016/0271561 A1 * | 9/2016 | Nakayama ......... B01D 53/9454 |

* cited by examiner

ELECTRICALLY HEATED CATALYTIC DEVICE

RELATED APPLICATIONS

The present application claims priority of Japanese Application Number 2019-185866, filed on Oct. 9, 2019, the disclosure of which is hereby incorporated by reference herein in its entirety.

BACKGROUND

1. Field

The present disclosure relates to an electrically heated catalytic device.

2. Description of Related Art

A typical electrically heated catalytic device is arranged at an exhaust passage or the like of an internal combustion engine. By energizing and heating a carrier, the electrically heated catalytic device increases the activation of a catalyst supported by the carrier.

Japanese Laid-Open Patent Publication No. 2012-106199 describes an example of an electrically heated catalytic device including a columnar carrier that supports a catalyst, a surface electrode provided on the outer circumferential surface of the carrier and extended in the axial direction of the carrier, and multiple metal electrodes arranged side by side in the axial direction on the surface of the surface electrode. The surface of the surface electrode is provided with an arrangement region where the metal electrodes are spaced apart from one another and a non-arrangement region where the metal electrodes are not arranged. The non-arrangement region is adjacent to the arrangement region in the axial direction.

When the arrangement region cracks, the following inconvenience may occur. That is, when cracks occur, a region in which the electrical connection is weak is created in the arrangement region of the surface electrode. Thus, the electrical resistance of the carrier in the non-arrangement region is smaller than the electrical resistance of the carrier in the cracked arrangement region. Accordingly, among the multiple metal electrodes arranged on the arrangement region, when the metal electrodes located on the opposite extremities of the carrier in the axial direction are referred to as end metal electrodes and the metal electrode located between the two end metal electrodes is referred to as an intermediate metal electrode, a larger amount of current flows into the end metal electrodes, which are electrically connected to the non-arrangement region with a small electrical resistance of the carrier, than the intermediate metal electrode. As a result, the end metal electrodes overheat.

SUMMARY

To solve the above-described problem, an electrically heated catalytic device is provided according to a first aspect of the present disclosure. The electrically heated catalytic device includes a columnar carrier that supports a catalyst, a surface electrode extended in an axial direction of the carrier and provided on an outer circumferential surface of the carrier, and metal electrodes arranged side by side in the axial direction on a surface of the surface electrode. The surface electrode includes an arrangement region where the metal electrodes are arranged and a non-arrangement region where the metal electrodes are not arranged. The metal electrodes are spaced apart from one another in the axial direction in the arrangement region. The non-arrangement region is adjacent to the arrangement region in the axial direction. An electrical resistance of the non-arrangement region is higher than an electrical resistance of the arrangement region in the surface electrode.

To solve the above-described problem, an electrically heated catalytic device is provided according to a second aspect of the present disclosure. The electrically heated catalytic device includes a columnar carrier that supports a catalyst, a surface electrode extended in an axial direction of the carrier and provided on an outer circumferential surface of the carrier, and metal electrodes arranged side by side in the axial direction on a surface of the surface electrode. The surface electrode includes an arrangement region where the metal electrodes are arranged and a non-arrangement region where the metal electrodes are not arranged. The metal electrodes are spaced apart from one another in the axial direction in the arrangement region. The non-arrangement region is spaced apart from the arrangement region in the axial direction An electrical resistance of the non-arrangement region is less than or equal to an electrical resistance of the carrier in the surface electrode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An electrically heated catalytic device 10 according to a first embodiment will now be described with reference to FIGS. 1 to 8. The electrically heated catalytic device 10 is provided at, for example, an exhaust passage of an automobile or the like to purify exhaust gas emitted from the internal combustion engine. In the following description, the axial direction of a carrier 12 and the circumferential direction of the carrier 12 are simply referred to as an axial direction and a circumferential direction.

Figure 1:
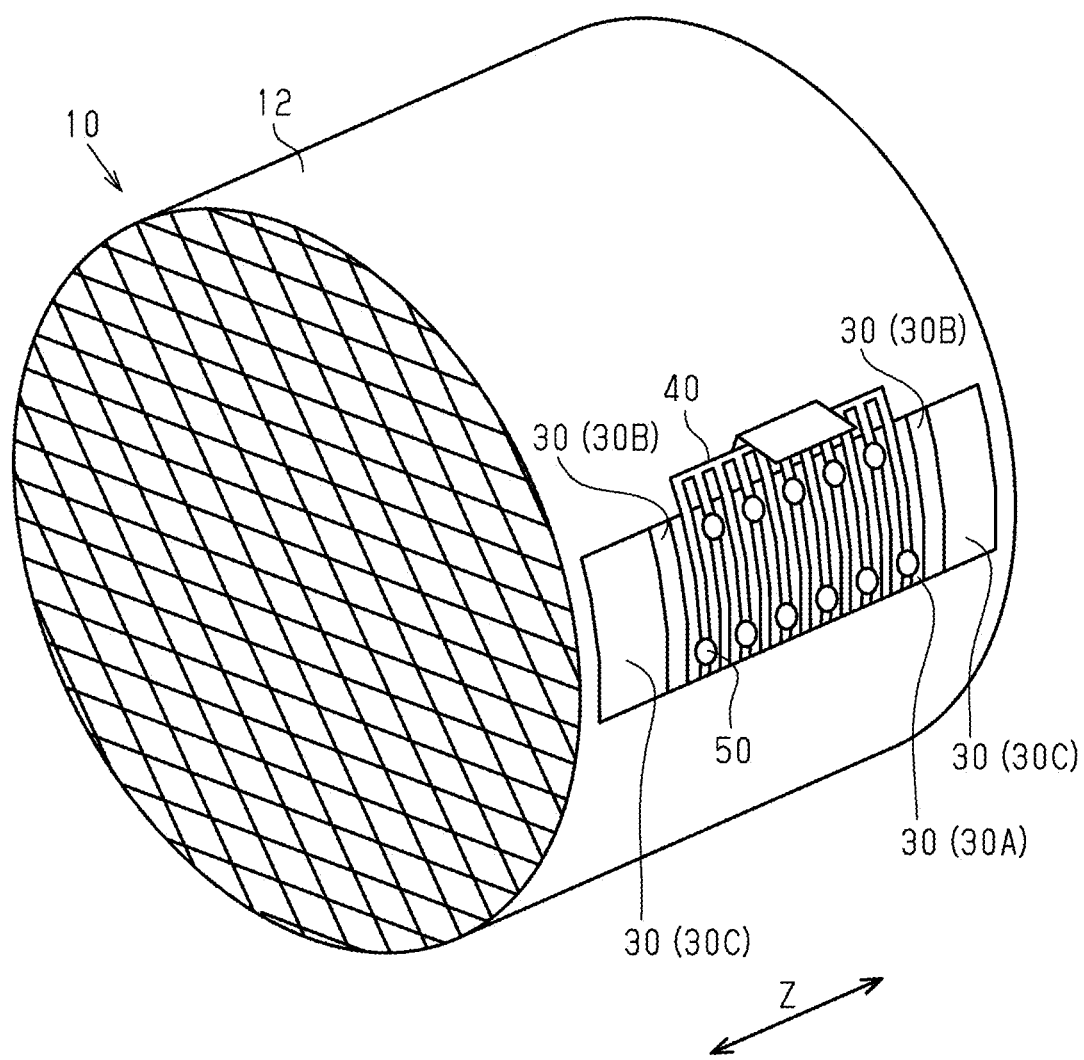
FIG. 1 a perspective view showing an electrically heated catalytic device according to a first embodiment.

As shown in FIG. 1, the electrically heated catalytic device 10 includes the carrier 12, which is columnar. The carrier 12 is made of a conductive porous material such as silicon carbide (SiC). The carrier 12 supports a catalyst such as platinum or palladium. As shown by arrow Z in FIG. 1, exhaust gas passes through the carrier 12 in the axial direction.

Figure 2:
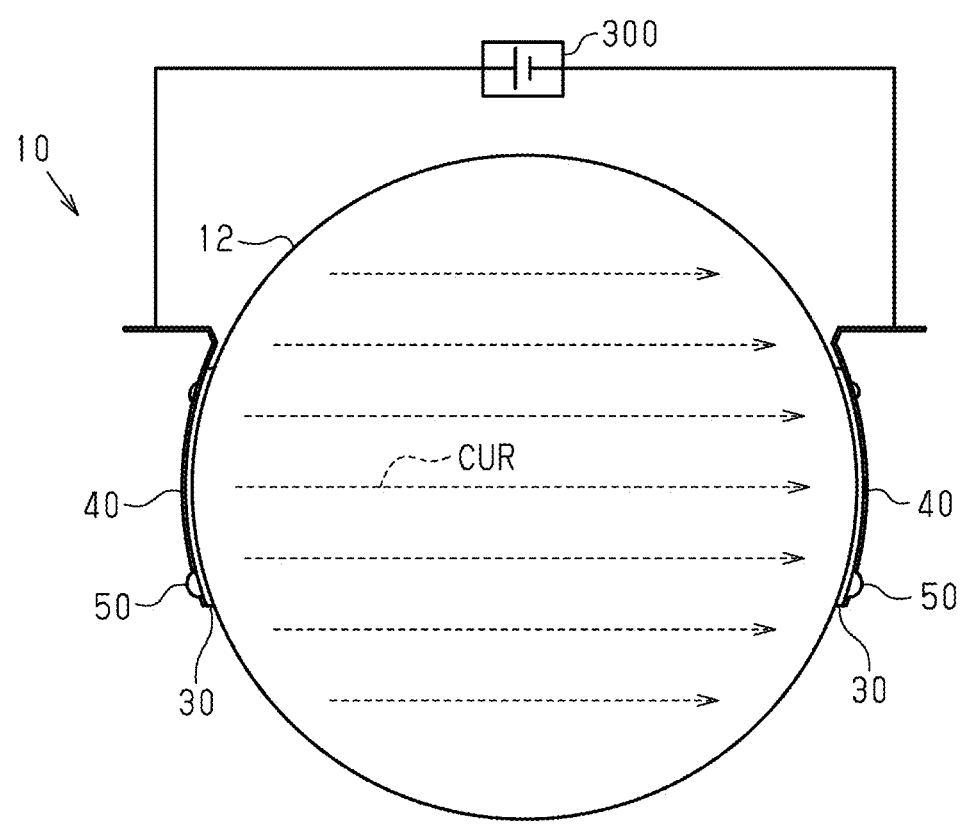
FIG. 2 is a front view of the electrically heated catalytic device.

As shown in FIGS. 1 and 2, two surface electrodes 30 are provided on the outer circumferential surface of the carrier 12. The two surface electrodes 30 are opposed to each other in the radial direction of the carrier 12.

Figure 3:
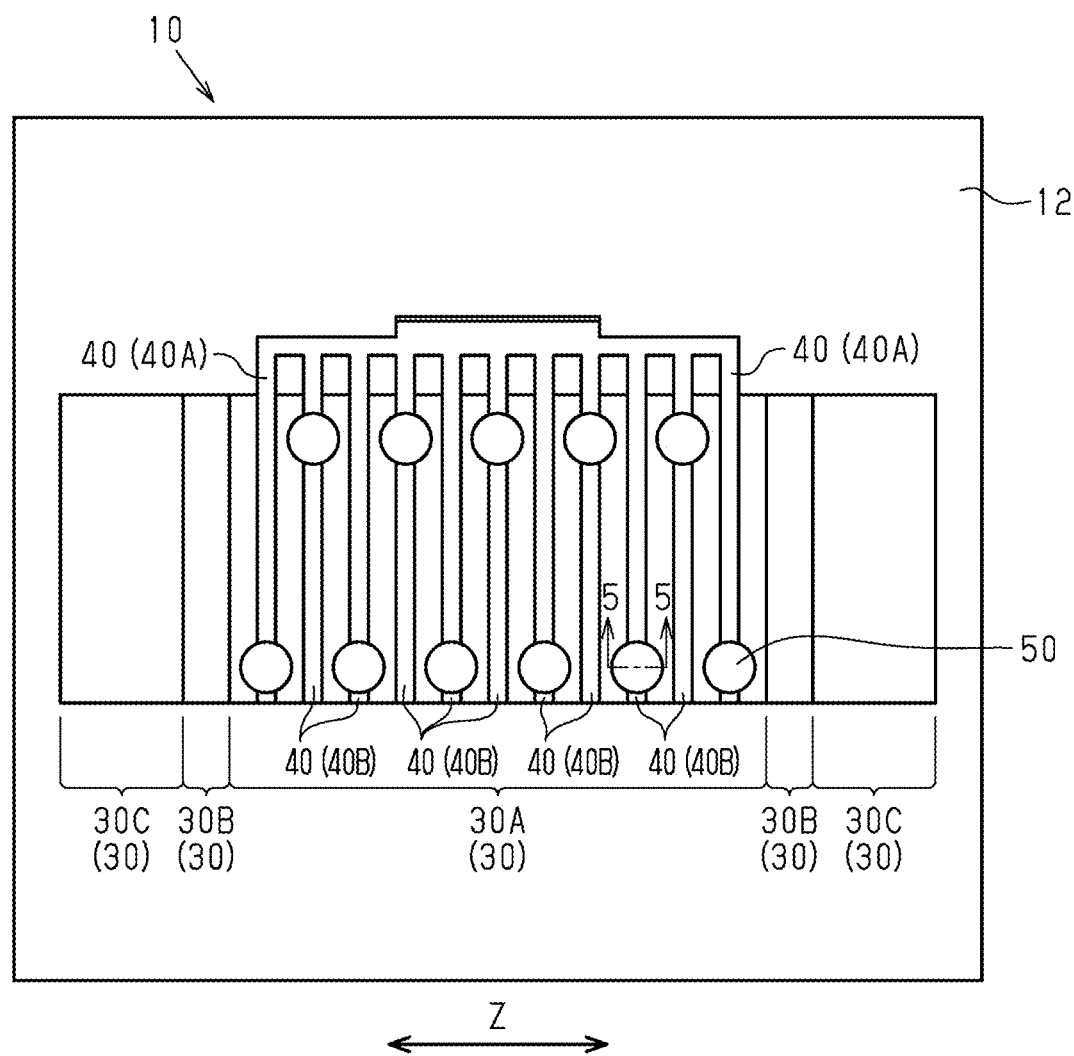
FIG. 3 is a side view of the electrically heated catalytic device.

As shown in FIGS. 1 and 3, the surface electrode 30 has a flat rectangular shape. The surface electrode 30 extends in the axial direction of the carrier 12. The surface electrode 30 includes porous membranes that are formed on the surface of the carrier 12 through thermal spraying. The surface electrode 30 is made of a metal material, such as NiCr alloy, excellent in acid resistance under high temperature.

Multiple metal electrodes 40 are provided on a part of the surface of each surface electrode 30 in the axial direction. The surface electrode 30 includes an arrangement region 30A, where the metal electrodes 40 are arranged, and first non-arrangement regions 30B and second non-arrangement regions 30C, where the metal electrodes 40 are not arranged. In the arrangement region 30A, the metal electrodes 40 are spaced apart from one another in the axial direction. The first non-arrangement regions 30B are adjacent to the arrangement region 30A in the axial direction. The second non-arrangement regions 30C are adjacent to the first non-arrangement regions 30B on the opposite sides of the arrangement region 30A in the axial direction.

In more detail, the arrangement region 30A is located at substantially the middle of the surface electrode 30 in the axial direction. The first non-arrangement regions 30B are belt-shaped. Each one of the first non-arrangement regions 30B is arranged on the corresponding one of the opposite sides of the arrangement region 30A in the axial direction. The second non-arrangement regions 30C are belt-shaped. The second non-arrangement regions 30C are respectively adjacent to the first non-arrangement regions 30B on the opposite sides of the arrangement region 30A. In this manner, the first non-arrangement regions 30B and the second non-arrangement regions 30C are arranged side by side sequentially from the arrangement region 30A of the surface electrode 30 in the axial direction.

Figure 4:
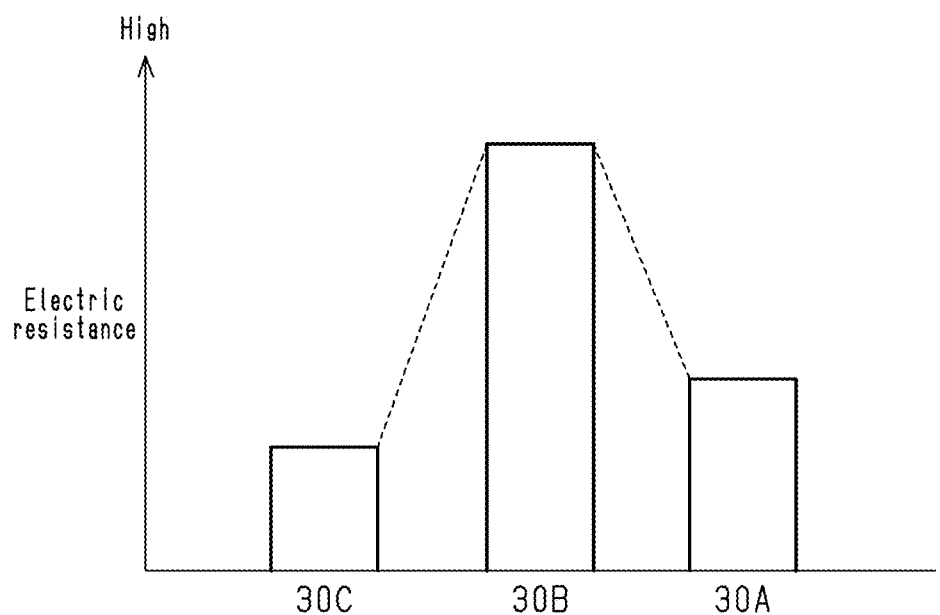
FIG. 4 is a graph showing the electrical resistance of each region of the surface electrode.

As shown in FIG. 4, the electrical resistance of the first non-arrangement region 30B is higher than the electrical resistance of the arrangement region 30A. Further, the electrical resistance of the second non-arrangement region 30C is lower than the electrical resistance of the first non-arrangement region 30B. In more detail, the electrical resistance of the second non-arrangement region 30C is lower than the electrical resistance of the arrangement region 30A. The differences in the electrical resistance between the arrangement region 30A, the first non-arrangement region 30B, and the second non-arrangement region 30C are achievable through appropriate methods. For example, in the first embodiment, the amount of impurities contained in the material of the surface electrode 30 is adjusted to differentiate the composition of the material in each region so that the volume resistivity (resistance value per unit length×unit cross-sectional area) of each of the arrangement region 30A, the first non-arrangement region 30B, and the second non-arrangement region 30C becomes different. Thus, because of the difference in the volume resistivity, the electrical resistance of each region decreases in the order of the first non-arrangement region 30B, the arrangement region 30A, to the second non-arrangement region 30C. The electrical resistance of each of the arrangement region 30A, the first non-arrangement region 30B, and the second non-arrangement region 30C is less than or equal to the electrical resistance of the carrier 12.

The difference in the electrical resistance between the arrangement region 30A, the first non-arrangement region 30B, and the second non-arrangement region 30C does not have to be made by differentiating the volume resistivity and may also be made as follows. That is, the arrangement region 30A, the first non-arrangement region 30B, and the second non-arrangement region 30C of the surface electrode 30 are made of a single material. The electrical resistance of the first non-arrangement region 30B may be set to be higher than the electrical resistance of the arrangement region 30A by setting, as a reference cross-sectional area, a horizontal cross-sectional area Sa of the arrangement region 30A in the radial direction of the carrier 12 and setting a horizontal cross-sectional area Sb of the first non-arrangement region 30B to be smaller than the reference cross-sectional area. The horizontal cross-sectional area Sb can be set to be smaller than the reference cross-sectional area by setting the thickness of the first non-arrangement region 30B to be smaller than the thickness of the arrangement region 30A or setting the length of the first non-arrangement region 30B in the circumferential direction to be smaller than the length of the arrangement region 30A in the circumferential direction. In the same manner, the electrical resistance of the second non-arrangement region 30C may be set to be lower than the electrical resistance of the arrangement region 30A by setting a horizontal cross-sectional area Sc of the second non-arrangement region 30C to be larger than the reference cross-sectional area. The horizontal cross-sectional area Sc can be set to be larger than the reference cross-sectional area by setting the thickness of the second non-arrangement region 30C to be larger than the thickness of the arrangement region 30A or setting the length of the second non-arrangement region 30C in the circumferential direction to be larger than the length of the arrangement region 30A in the circumferential direction.

As shown in FIGS. 1 and 3, the metal electrodes 40 are ribbon-shaped thin metal plates extending along the entire surface electrode 30 in the circumferential direction. The metal electrodes 40 are made of, for example, heat-resistant alloy such as FeCrAlY alloy. The metal electrodes 40 are arranged side by side at substantially equal intervals in the axial direction on the surface of the surface electrode 30. The metal electrodes 40 are protruded from one side edge of the surface electrode 30 and integrated at the terminals of the protrusions. As shown in FIG. 2, the metal electrodes 40 are connected to a power supply 300 on the surface electrodes 30.

Figure 5:
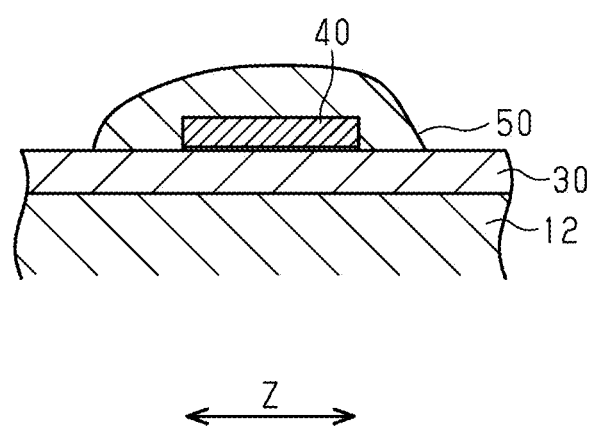
FIG. 5 is a cross-sectional view taken along line 5-5 in FIG. 3.

As shown in FIG. 5, the metal electrode 40 is fixed to the surface electrode 30 by a conductive fixing layer 50. The fixing layer 50 includes porous membranes that are formed on the surfaces of the metal electrode 40 and the surface electrode 30 through thermal spraying. The fixing layer 50 is made of a metal material, such as NiCr alloy, excellent in acid resistance under high temperature. The fixing layer 50 is fixed to the surface electrode 30 in a state where the fixing layer 50 covers the metal electrode 40 and is in contact with the surface of the surface electrode 30.

As shown in FIGS. 1 to 3, the fixing layers 50 are sparsely arranged at a number of positions on the surfaces of the metal electrodes 40 and the surface electrodes 30. The fixing layer 50 locally joins the metal electrode 40 and the surface electrode 30 to each other. For example, each metal electrode 40 is fixed to the surface electrode 30 by a single fixing layer 50. The fixing layers 50 on adjacent ones of the metal electrodes 40 are deviated from each other in the circumferential direction.

The operational advantages of the first embodiment will now be described.

In the following description, as shown in FIG. 3 and the like, the metal electrodes 40 located at the extremities of the metal electrodes 40 on the arrangement region 30A in the axial direction are referred to as end metal electrodes 40A and the metal electrodes 40 other than the end metal electrodes 40A are referred to as intermediate metal electrodes 40B. The intermediate metal electrodes 40B are arranged between the two end metal electrodes 40A.

(1) As shown in FIG. 2, in the electrically heated catalytic device 10, when power is supplied from the power supply 300 to the metal electrodes 40, current flows from the metal electrodes 40 to the surface electrodes 30. The current flowing in one surface electrode 30 flows through the carrier 12 and toward another surface electrode 30. When current flows through the carrier 12, the carrier 12 is heated. This activates the catalyst supported by the carrier 12. The activation of the catalyst purifies hydrocarbon, carbon monoxide, nitrogen oxide, and the like in the exhaust gas that passes through the carrier 12.

Figure 6:
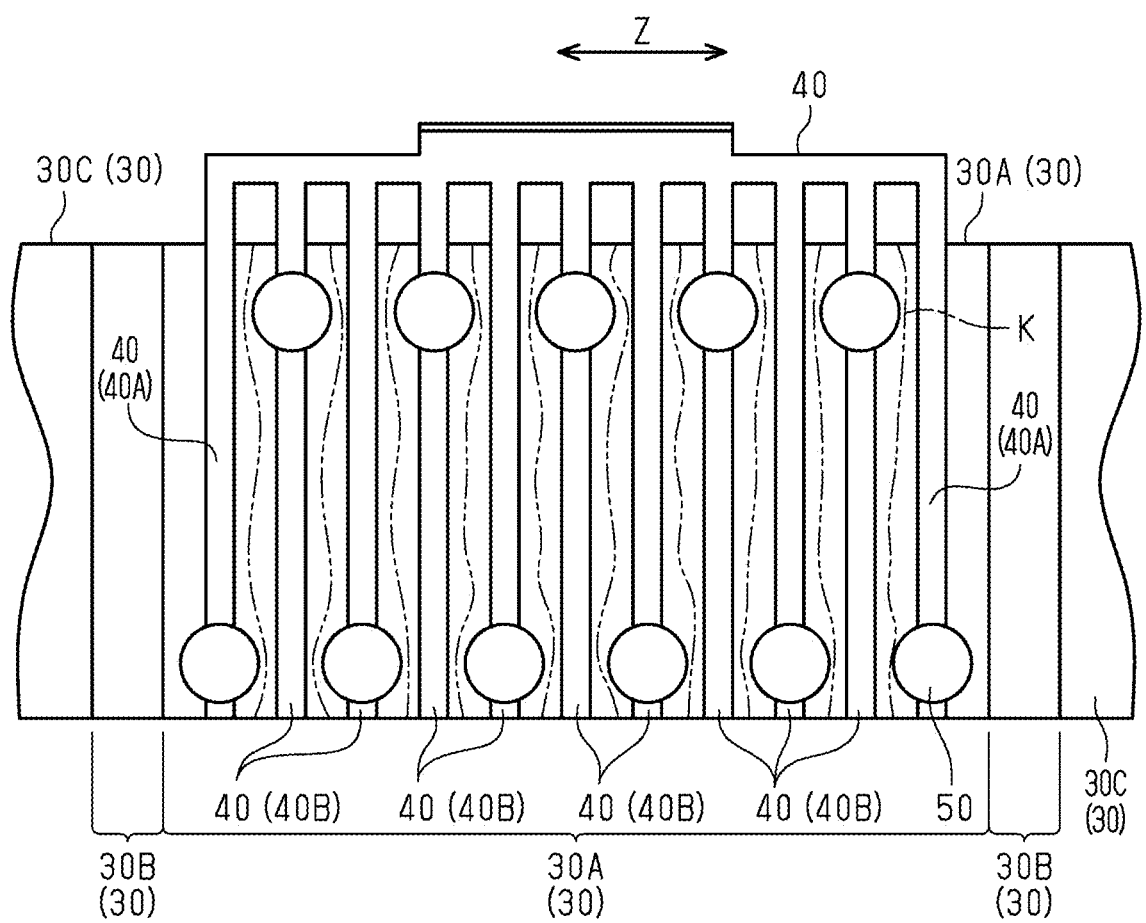
FIG. 6 is an enlarged view of the metal electrode.

As shown in FIG. 6, in the arrangement region 30A, the surface electrode 30 between adjacent ones of the metal electrodes 40 easily receives thermal stress that results from the difference in the coefficient of thermal expansion between the metal electrodes 40 and the surface electrode 30. Thus, in the surface electrode 30 between the adjacent metal electrodes 40 in the arrangement region 30A, cracks K resulting from thermal stress easily occur in the circumferential direction of the carrier 12 as shown by the long dashed double-short dashed lines.

Figure 7:
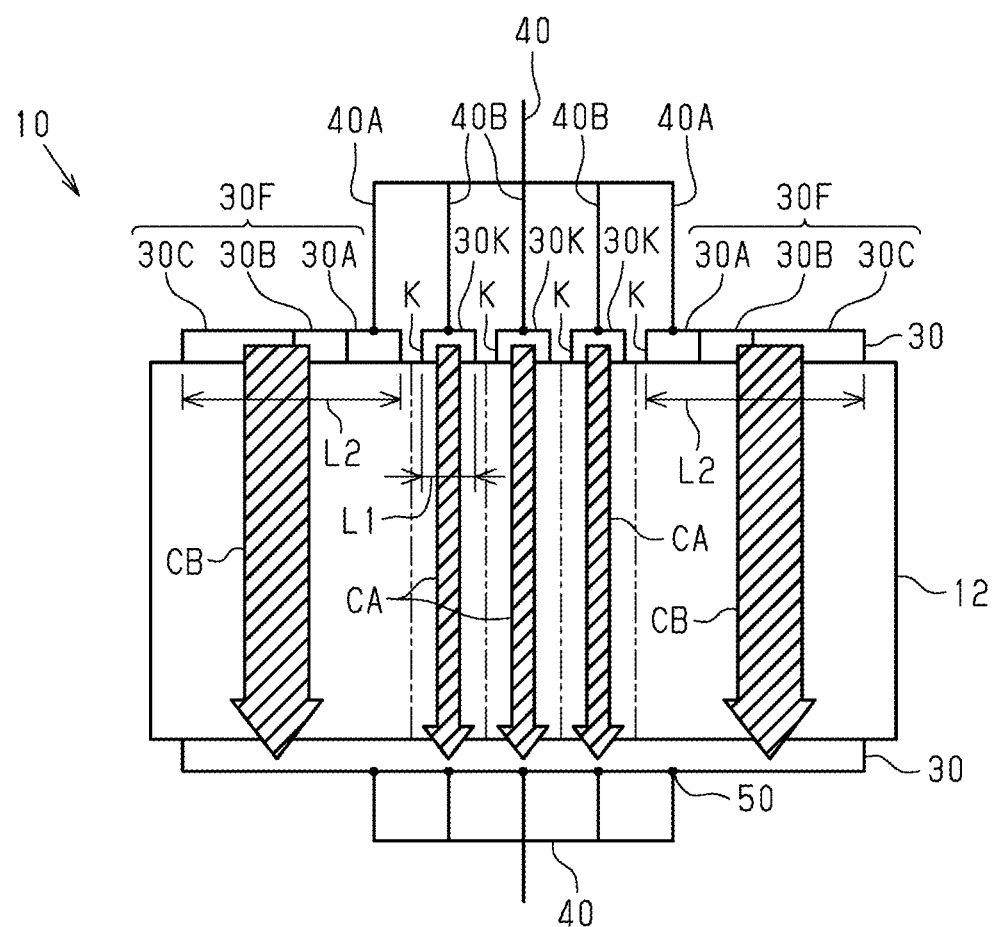
FIG. 7 is a schematic diagram showing the flow of currents in the carrier when cracks occur.

As shown in FIG. 7, the occurrence of the cracks K provides divided portions 30K in the arrangement region 30A of the surface electrode 30. The divided portions 30K are regions which are divided by the cracks K and to which the intermediate metal electrodes 40B are fixed. Each divided portion 30K is a region in which the electrical connection is weak in the arrangement region 30A of the surface electrode 30.

When the electrical resistance of the first non-arrangement region 30B is the same as the electrical resistance of the arrangement region 30A, the following inconvenience occurs.

Length L1 of the above-described divided portion 30K in the axial direction is smaller than length L2 of a surface electrode 30F, which is electrically connected to the end metal electrode 40A, during the occurrence of cracks. That is, length L1 is smaller than length L2 of the arrangement region 30A, the first non-arrangement region 30B, and the second non-arrangement region 30C, which are electrically connected to the end metal electrode 40A, in the axial direction. Accordingly, the contact area of each divided portion 30K and the carrier 12 is smaller than the contact area of the surface electrode 30F and the carrier 12.

Thus, when the path of current flowing out of the divided portion 30K from one cracked surface electrode 30 toward another surface electrode 30 is referred to as a current path CA and the path of current flowing out of the surface electrode 30F is referred to as a current path CB, the electrical resistance of the carrier 12 in the current path CA is higher than the electrical resistance of the carrier 12 in the current path CB.

Accordingly, the current flowing through the current path CB is larger than the current flowing through the current path CA. That is, the current flowing through the carrier 12 via the end metal electrode 40A, the fixing layer 50 fixing the end metal electrode 40A, and the surface electrode 30F is larger than the current flowing through the carrier 12 via the intermediate metal electrode 40B, the fixing layer 50 fixing the intermediate metal electrode 40B, and the divided portion 30K of the arrangement region 30A.

When the current flowing through the end metal electrode 40A becomes large, the end metal electrode 40A overheats. When the heat generation amount of the end metal electrode 40A increases, the end metal electrode 40A may be melted and cut off. Further, when the current flowing through the fixing layer 50 fixing the end metal electrode 40A becomes large, the heat generation amount of the fixing layer 50 increases. When the heat generation amount of the fixing layer 50 fixing the end metal electrode 40A increases excessively, the heat stress of the fixing layer 50 may increase so that the fixing layer 50 is cracked or the fixing layer 50 is melted and cut off.

In the first embodiment, the electrical resistance of the first non-arrangement region 30B, which is adjacent to the arrangement region 30A where the metal electrodes 40 are arranged, is higher than the electrical resistance of the arrangement region 30A. Accordingly, as compared with when the electrical resistance of the first non-arrangement region 30B is the same as the electrical resistance of the arrangement region 30A, the flow of current from the arrangement region 30A of the surface electrode 30, to which the end metal electrode 40A is fixed, to the first non-arrangement region 30B is limited during the occurrence of the cracks K. Thus, the current flowing through the end metal electrode 40A is decreased. This limits the overheating of the end metal electrode 40A when the cracks K occur. As a result, the reliability of the end metal electrode 40A improves.

(2) When the current flowing through the end metal electrode 40A decreases, the current flowing through the fixing layer 50 fixing the end metal electrode 40A decreases. Thus, when the cracks K occur, an increase in the heat generation amount of the fixing layer 50 fixing the end metal electrode 40A can be limited. As a result, the reliability of the fixing layer 50 improves.

Figure 8:
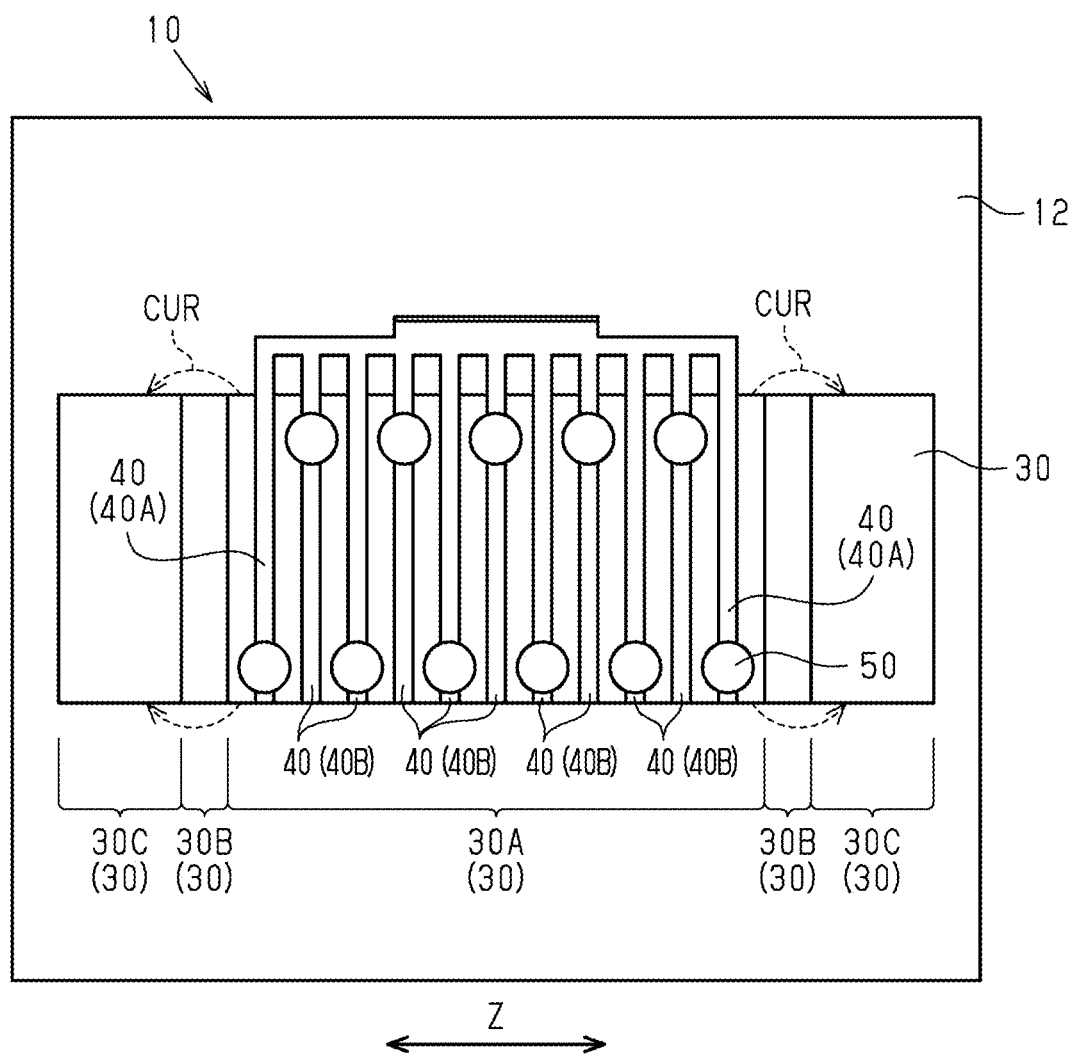
FIG. 8 a side view illustrating the operation of the electrically heated catalytic device.

(3) As shown in FIG. 8, the first non-arrangement regions 30B and the second non-arrangement regions 30C are arranged side by side sequentially from the arrangement region 30A of the surface electrode 30 in the axial direction. Since the electrical resistance of the second non-arrangement region 30C is lower than the electrical resistance of the first non-arrangement region 30B, a part of current CUR that has flowed through the arrangement region 30A of the surface electrode 30 flows toward the second non-arrangement region 30C, which has a lower electrical resistance than the first non-arrangement region 30B and through which current flows more easily than the first non-arrangement region 30B. The current CUR that has flowed through the second non-arrangement region 30C flows from the surface of the carrier 12, with which the second non-arrangement region 30C is in contact, toward the inside of the carrier 12. This heats the inside of the part of the carrier 12 corresponding to the portion with which the second non-arrangement region 30C is in contact. Accordingly, as compared with when the surface electrode 30 does not include the second non-arrangement region 30C, the heating range of the carrier 12 in the axial direction can be widened.

(4) As shown in FIG. 4, the electrical resistance of the second non-arrangement region 30C is lower than the electrical resistance of the arrangement region 30A. This allows a part of the current CUR that has flowed through the arrangement region 30A of the surface electrode 30 to flow toward the second non-arrangement region 30C more easily. Accordingly, the inside of the portion of the carrier 12 corresponding to the part with which the second non-arrangement region 30C is in contact can be further heated.

Second Embodiment

An electrically heated catalytic device 100 according to a second embodiment will now be described with reference to FIGS. 9 to 11. The second embodiment has a configuration that does not include the first non-arrangement regions 30B, which have been described in the first embodiment. The electrically heated catalytic device 100 of the second embodiment will now be described, focusing on the differences from the first embodiment.

Figure 9:
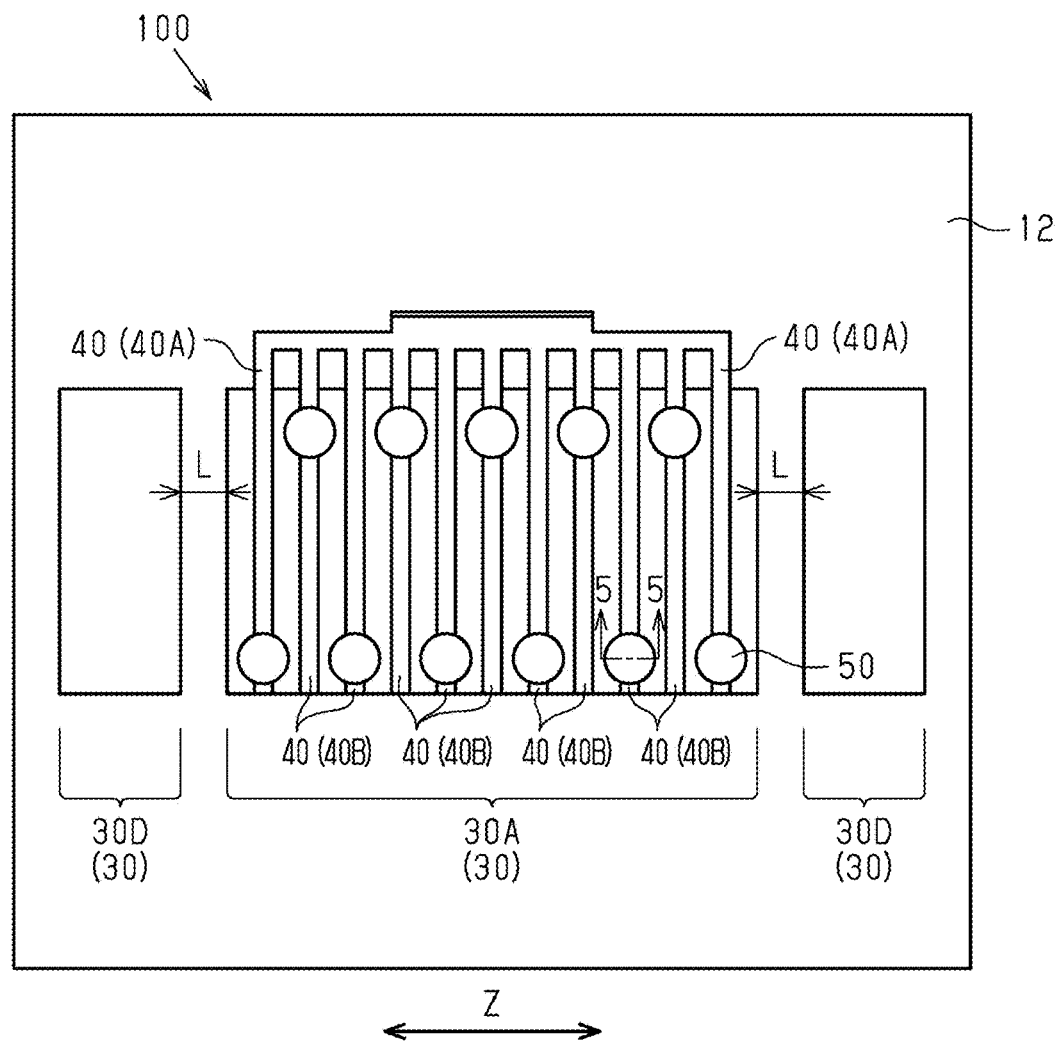
FIG. 9 is a side view of an electrically heated catalytic device according to a second embodiment.

As shown in FIG. 9, the electrically heated catalytic device 100 includes the surface electrode 30, which has the shape of a rectangular flat surface. The surface electrode 30 extends in the axial direction of the carrier 12. The surface electrode 30 includes porous membranes that are formed on the surface of the carrier 12 through thermal spraying. The surface electrode 30 is made of a metal material, such as NiCr alloy, excellent in acid resistance under high temperature.

Multiple metal electrodes 40 are provided on a part of the surface of each surface electrode 30 in the axial direction. The surface electrode 30 includes the arrangement region 30A, where the metal electrodes 40 are arranged, and non-arrangement regions 30D, where the metal electrodes 40 are not arranged. In the arrangement region 30A, the metal electrodes 40 are spaced apart from one another in the axial direction. The non-arrangement regions 30D are spaced apart from the arrangement region 30A in the axial direction by distance L.

In more detail, the arrangement region 30A is located at substantially the middle of the carrier 12 in the axial direction. The non-arrangement regions 30D are belt-shaped. Each one of the first non-arrangement regions 30D is arranged on the corresponding one of the opposite sides of the arrangement region 30A in the axial direction.

Figure 10:
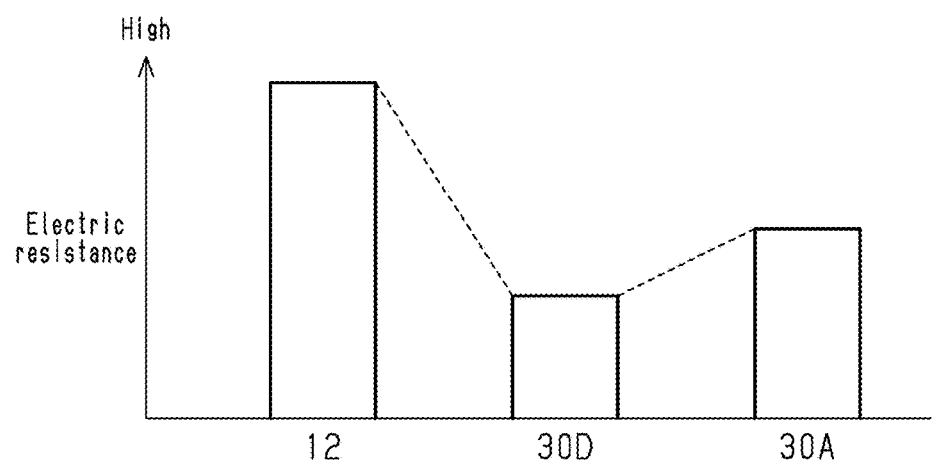
FIG. 10 is a graph showing the electrical resistance of each region of the surface electrode and the electrical resistance of the carrier.

As shown in FIG. 10, the electrical resistance of the non-arrangement region 30D is lower than the electrical resistance of the carrier 12 and is also lower than the electrical resistance of the arrangement region 30A. The differences in the electrical resistance between the carrier 12, the arrangement region 30A, and the non-arrangement region 30D are achievable through appropriate methods. For example, in the second embodiment, each of the amounts of impurities contained in the materials of the arrangement region 30A and the non-arrangement region 30D of the surface electrode 30 is adjusted to differentiate the composition of the material in each region so that the volume resistivity (resistance value per unit length×unit cross-sectional area) of each of the arrangement region 30A and the non-arrangement region 30D becomes different. Thus, because of the difference in the volume resistivity, the electrical resistance of each region decreases in the order of the arrangement region 30A and the non-arrangement region 30D. By adjusting the composition of the material of the carrier 12, the electrical resistance of the carrier 12 becomes higher than the electrical resistance of each of the arrangement region 30A and the non-arrangement region 30D.

The metal electrodes 40 and the fixing layers 50 of the second embodiment are the same as those of the first embodiment.

The operational advantages of the second embodiment will now be described.

Figure 11:
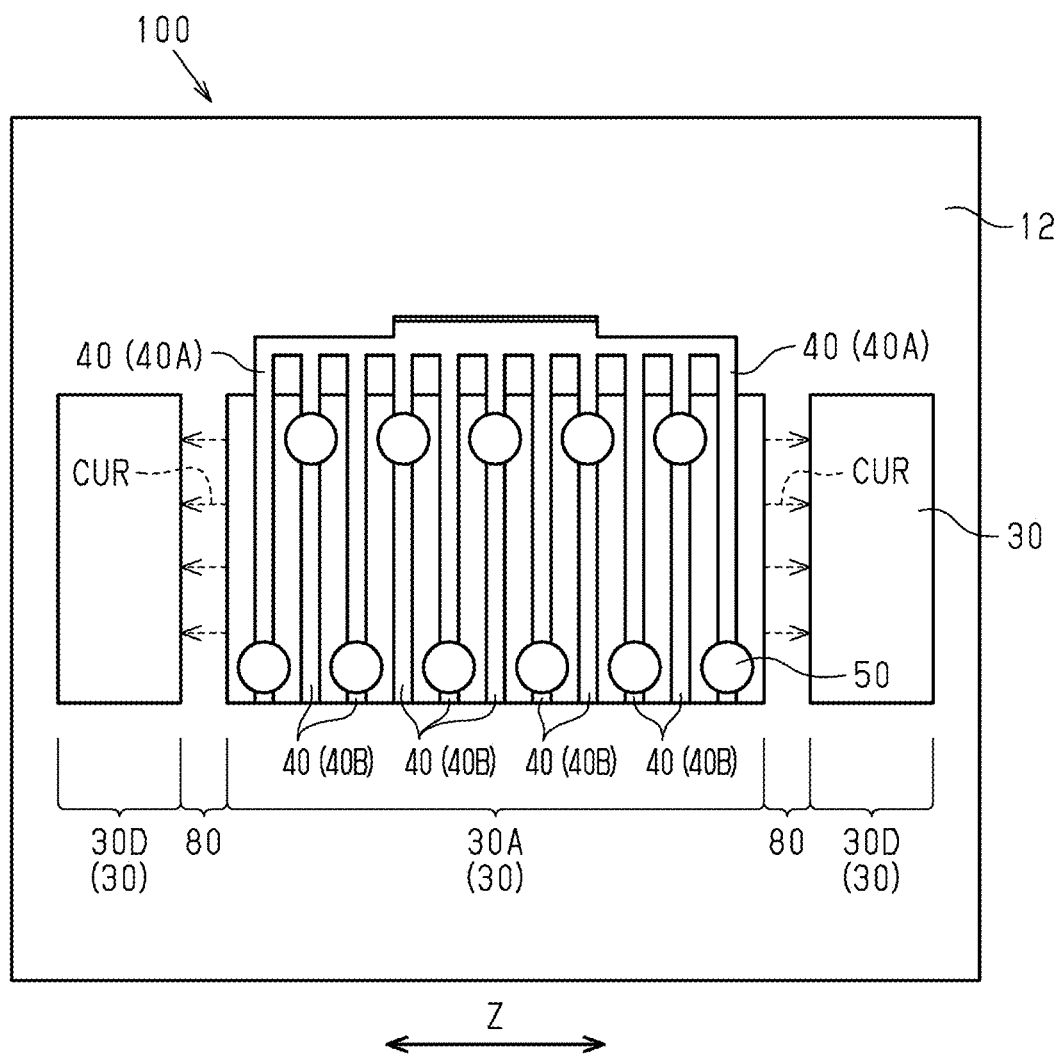
FIG. 11 a side view illustrating the operation of the electrically heated catalytic device.

(5) As shown in FIG. 11, the non-arrangement region 30D, where the metal electrodes 40 are not arranged, are spaced apart from the arrangement region 30A, where the metal electrode 40 are arranged, by the distance L in the axial direction. Thus, as compared with when the arrangement region 30A and the non-arrangement regions 30D are continuously connected to each other without the distance L, the electrical resistances of regions 80, by which the arrangement region 30A and the non-arrangement regions 30D are spaced apart from each other by the distance L, are high in the second embodiment. That is, in the same manner as the first embodiment, the electrical resistances of the regions adjacent to the arrangement region 30A of the surface electrode 30 are higher than the electrical resistance of the arrangement region 30A even in the second embodiment. Accordingly, the flow of current from the arrangement region 30A of the surface electrode 30, to which the end metal electrode 40A is fixed, to the non-arrangement region 30D is limited during the occurrence of the cracks K. Thus, the current flowing through the end metal electrode 40A is decreased. This limits the overheating of the end metal electrode 40A when the cracks K occur. As a result, the reliability or the like of the end metal electrode 40A improves.

(6) When the current flowing through the end metal electrode 40A decreases, the current flowing through the fixing layer 50 fixing the end metal electrode 40A decreases. Thus, when the cracks K occur, an increase in the heat generation amount of the fixing layer 50 fixing the end metal electrode 40A can be limited. As a result, the reliability of the fixing layer 50 improves.

(7) Further, although current does not easily flow from the arrangement region 30A of the surface electrode 30 to the non-arrangement region 30D, the electrical resistance of the non-arrangement region 30D is lower than the electrical resistance of the carrier 12 in the second embodiment as shown in FIG. 10. Thus, as compared with when the electrical resistance of the non-arrangement region 30D is higher than the electrical resistance of the carrier 12, a part of the current CUR that has flowed through the arrangement region 30A of the surface electrode 30 easily flows toward the non-arrangement regions 30D, which have a low electrical resistance and through which current easily flows, as shown in FIG. 11. The current CUR that has flowed through the non-arrangement region 30D flows from the surface of the carrier 12, with which the non-arrangement region 30D is in contact, toward the inside of the carrier 12. This heats the inside of the part of the carrier 12 corresponding to the portion with which the non-arrangement region 30D is in contact. Accordingly, as compared with when the surface electrode 30 is not provided with the non-arrangement region 30D, the heating range of the carrier 12 in the axial direction can be widened.

(8) In addition, as shown in FIG. 10, the electrical resistance of the non-arrangement region 30D is lower than the electrical resistance of the arrangement region 30A. This allows a part of the current CUR that has flowed through the arrangement region 30A of the surface electrode 30 to flow toward the non-arrangement region 30D more easily. Accordingly, the inside of the portion of the carrier 12 corresponding to the part with which the non-arrangement region 30D is in contact can be further heated.

The above-described embodiments may be modified as follows. The above-described embodiments and the following modifications can be combined as long as the combined modifications remain technically consistent with each other.

In the first embodiment, the second non-arrangement regions 30C may be omitted. Even in this case, the above-described operational advantage (1) is gained.

Figure 12:
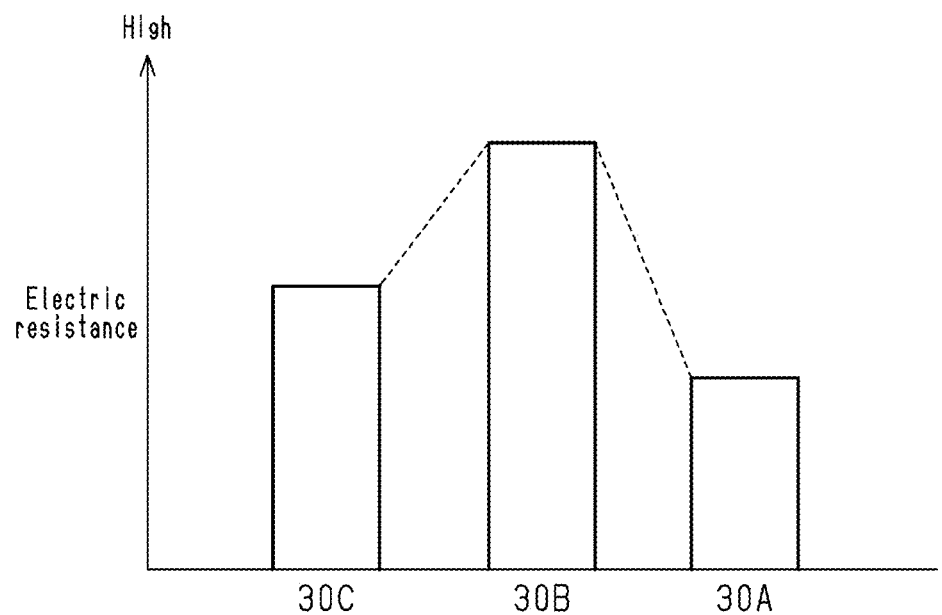
FIG. 12 is a graph showing the electrical resistance of each region of the surface electrode according to a modification of the first embodiment.

In the first embodiment, as shown in FIG. 4, the electrical resistance of the second non-arrangement region 30C is set to be lower than the electrical resistance of the first non-arrangement region 30B and lower than the electrical resistance of the arrangement region 30A. Alternatively, as shown in FIG. 12, the electrical resistance of the second non-arrangement region 30C may be set to be lower than the electrical resistance of the first non-arrangement region 30B and higher than the electrical resistance of the arrangement region 30A. Even in this case, since the electrical resistance of the second non-arrangement region 30C is lower than the electrical resistance of the first non-arrangement region 30B, a part of the current CUR that has flowed through the arrangement region 30A of the surface electrode 30 flows toward the second non-arrangement region 30C, which has a lower electrical resistance than the first non-arrangement region 30B and through which current flows more easily than the first non-arrangement region 30B. Thus, the above-described operational advantage (2) is gained.

Figure 13:
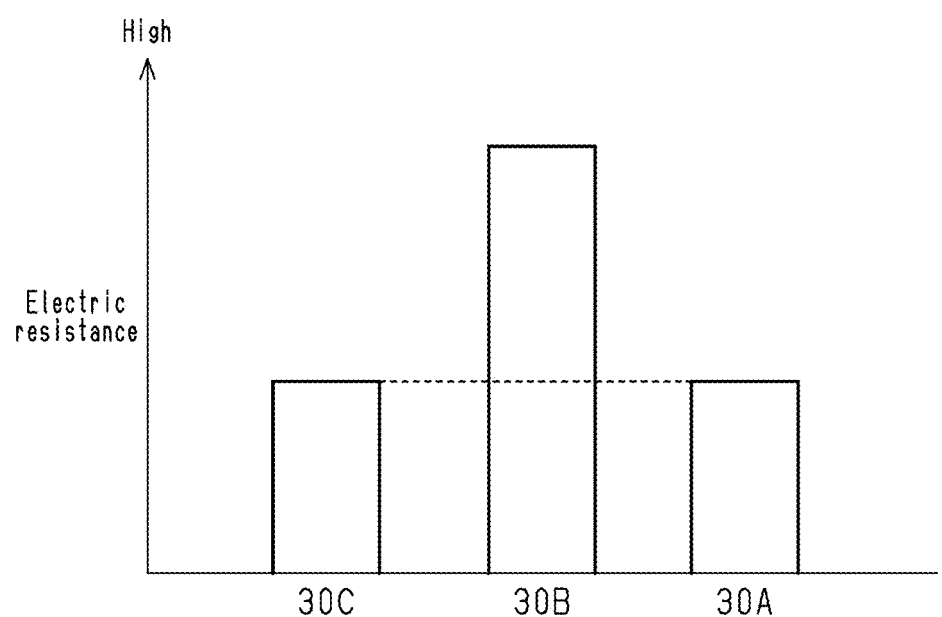
FIG. 13 is a graph showing the electrical resistance of each region of the surface electrode according to a modification of the first embodiment.

As shown in FIG. 13, in the first embodiment, the electrical resistance of the second non-arrangement region 30C may be set to be equal to the electrical resistance of the arrangement region 30A. That is, the electrical resistance of the second non-arrangement region 30C may be set to be less than or equal to the electrical resistance of the arrangement region 30A. Even in this case, as compared with when the electrical resistance of the second non-arrangement region 30C is set to be higher than the electrical resistance of the arrangement region 30A, current easily flows from the arrangement region 30A to the second non-arrangement region 30C.

Figure 14:
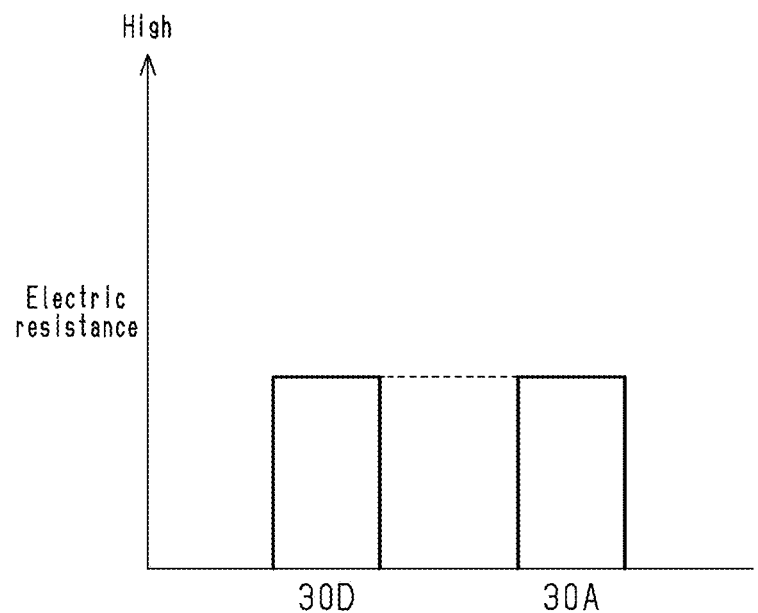
FIG. 14 is a graph showing the electrical resistance of each region of the surface electrode according to a modification of the second embodiment.

As shown in FIG. 14, in the second embodiment, the electrical resistance of the non-arrangement region 30D may be set to be equal to the electrical resistance of the arrangement region 30A. That is, the electrical resistance of the non-arrangement region 30D may be set to be less than or equal to the electrical resistance of the arrangement region 30A. Even in this case, as compared with when the electrical resistance of the non-arrangement region 30D is set to be higher than the electrical resistance of the arrangement region 30A, current easily flows from the arrangement region 30A to the non-arrangement region 30D.

Figure 15:
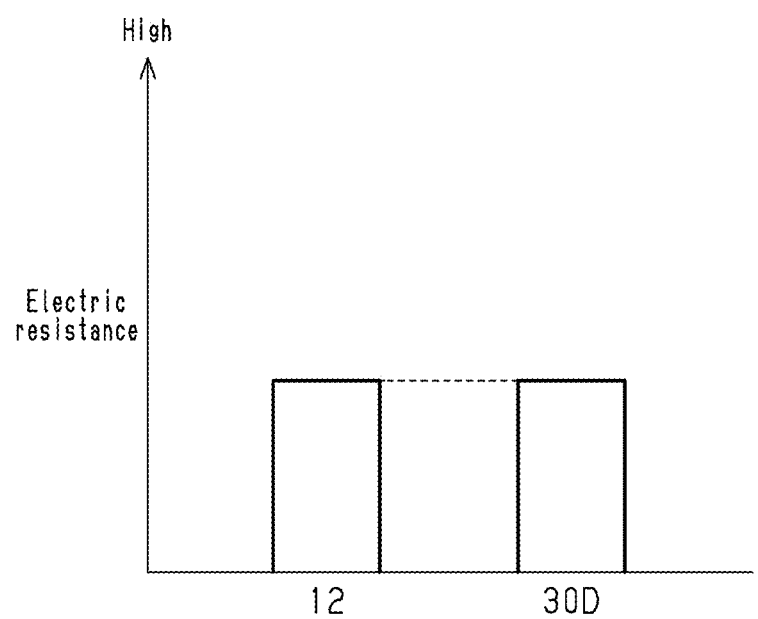
FIG. 15 is a graph showing the electrical resistance of the non-arrangement region of the surface electrode and the electrical resistance of the carrier according to a modification of the second embodiment.

As shown in FIG. 15, in the second embodiment, the electrical resistance of the non-arrangement region 30D may be set to be equal to the electrical resistance of the carrier 12. That is, the electrical resistance of the non-arrangement region 30D may be set to be less than or equal to the electrical resistance of the carrier 12. Even in this case, as compared with when the electrical resistance of the non-arrangement region 30D is set to be higher than the electrical resistance of the carrier 12, current easily flows from the arrangement region 30A to the non-arrangement region 30D.

In the first embodiment, each one of the first non-arrangement regions 30B and each one of the second non-arrangement regions 30C are provided on the corresponding one of the opposite sides of the arrangement region 30A in the axial direction. Instead, the first non-arrangement regions 30B and the second non-arrangement regions 30C may be provided on only one side of the arrangement region 30A in the axial direction. In the same manner, in the second embodiment, each one of the non-arrangement regions 30D is provided on the corresponding one of the opposite sides of the arrangement region 30A in the axial direction. Instead, the non-arrangement regions 30D may be provided on only one side of the arrangement region 30A in the axial direction.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An electrically heated catalytic device comprising:
a columnar carrier that supports a catalyst;
a surface electrode extended in an axial direction of the carrier and provided on an outer circumferential surface of the carrier; and
metal electrodes arranged side by side in the axial direction on a surface of the surface electrode when viewed along a direction perpendicular to the axial direction, wherein
the surface electrode includes
an arrangement region where the metal electrodes are arranged, and a non-arrangement region where the metal electrodes are not arranged, when viewed along the direction perpendicular to the axial direction, the metal electrodes are spaced apart from one another in the axial direction in the arrangement region, and the non-arrangement region is adjacent to the arrangement region in the axial direction, and an electrical resistance of the non-arrangement region is higher than an electrical resistance of the arrangement region in the surface electrode.

2. The electrically heated catalytic device according to claim 1, wherein a number of the metal electrodes is greater than two.

3. The electrically heated catalytic device according to claim 1, wherein the metal electrodes are coupled to a same terminal of a power supply.

4. The electrically heated catalytic device according to claim 1, wherein the metal electrodes are elongated along a circumferential direction of the carrier.

5. The electrically heated catalytic device according to claim 4, wherein the metal electrodes are physically and electrically connected with each other by a metal section elongated along the axial direction.

6. The electrically heated catalytic device according to claim 1, wherein when viewed along the direction perpendicular to the axial direction, the arrangement region is covered by the metal electrodes, the non-arrangement region is not covered by any of the metal electrodes, and the metal electrodes are spaced apart from one another by gaps in the axial direction in the arrangement region.

7. An electrically heated catalytic device comprising:

a columnar carrier that supports a catalyst;

a surface electrode extended in an axial direction of the carrier and provided on an outer circumferential surface of the carrier; and metal electrodes arranged side by side in the axial direction on a surface of the surface electrode, wherein the surface electrode includes an arrangement region where the metal electrodes are arranged, and a non-arrangement region where the metal electrodes are not arranged, the metal electrodes are spaced apart from one another in the axial direction in the arrangement region, the non-arrangement region is adjacent to the arrangement region in the axial direction, an electrical resistance of the non-arrangement region is higher than an electrical resistance of the arrangement region in the surface electrode, the non-arrangement region is referred to as a first non-arrangement region, the surface electrode further includes a second non-arrangement region where the metal electrodes are not arranged, the second non-arrangement region is adjacent to the first non-arrangement region on an opposite side of the arrangement region in the axial direction, and an electrical resistance of the second non-arrangement region is lower than an electrical resistance of the first non-arrangement region in the surface electrode.

8. The electrically heated catalytic device according to claim 7, wherein the electrical resistance of the second non-arrangement region is less than or equal to the electrical resistance of the arrangement region in the surface electrode.

9. An electrically heated catalytic device comprising:

a columnar carrier that supports a catalyst;

a surface electrode extended in an axial direction of the carrier and provided on an outer circumferential surface of the carrier; and metal electrodes arranged side by side in the axial direction on a surface of the surface electrode, wherein the surface electrode includes an arrangement region where the metal electrodes are arranged, and a non-arrangement region where the metal electrodes are not arranged, the metal electrodes are spaced apart from one another in the axial direction in the arrangement region, the non-arrangement region is spaced apart from the arrangement region in the axial direction, and an electrical resistance of the non-arrangement region is less than or equal to an electrical resistance of the carrier in the surface electrode.

10. The electrically heated catalytic device according to claim 9, wherein the electrical resistance of the non-arrangement region is less than or equal to an electrical resistance of the arrangement region in the surface electrode.

* * * * *